United States Patent
Meyer

(10) Patent No.: US 11,364,530 B2
(45) Date of Patent: Jun. 21, 2022

(54) WEDGE DRIVE AND METHOD FOR PRODUCING A WEDGE DRIVE HAVING OPTIMIZED GUIDANCE

(71) Applicant: FIBRO GMBH, Hassmersheim (DE)

(72) Inventor: Markus Meyer, Wangen im Allgäu (DE)

(73) Assignee: FIBRO GMBH, Hassmersheim (DE)

( * ) Notice: Subject to any disclaimer, the term of this patent is extended or adjusted under 35 U.S.C. 154(b) by 175 days.

(21) Appl. No.: 16/477,338

(22) PCT Filed: Jan. 18, 2018

(86) PCT No.: PCT/EP2018/051167
§ 371 (c)(1),
(2) Date: Jul. 11, 2019

(87) PCT Pub. No.: WO2018/153578
PCT Pub. Date: Aug. 30, 2018

(65) Prior Publication Data
US 2019/0374990 A1 Dec. 12, 2019

(30) Foreign Application Priority Data

Feb. 22, 2017 (DE) .................... 20 2017 100 989.0
Jul. 25, 2017 (DE) .................... 10 2017 116 794.3

(51) Int. Cl.
*B21D 19/08* (2006.01)
*B21D 28/20* (2006.01)
(Continued)

(52) U.S. Cl.
CPC ........... *B21D 19/084* (2013.01); *B21D 28/20* (2013.01); *B21D 28/325* (2013.01); *B23Q 3/103* (2013.01); *B30B 1/40* (2013.01); *F16H 25/183* (2013.01)

(58) Field of Classification Search
CPC ........ B30B 1/40; B21D 19/084; B21D 28/20; B21D 28/325; B23Q 3/103; F16H 25/183
See application file for complete search history.

(56) References Cited

U.S. PATENT DOCUMENTS 5,299,389 A * 4/1994 Yonaha ............ B25J 9/1684
451/11
2009/0078067 A1 3/2009 Weigelt
(Continued)

FOREIGN PATENT DOCUMENTS

DE 102012014546 A1 1/2014
DE 202015106966 U1 1/2016
(Continued)

OTHER PUBLICATIONS

International Search Report dated Apr. 18, 2018.
German Office Action dated Mar. 19, 2018.

*Primary Examiner* — Jeremy R Severson
(74) *Attorney, Agent, or Firm* — Dickinson Wright PLLC

(57) ABSTRACT

A wedge drive designed to redirect a vertical pressing force into a horizontal, linear working motion, comprising a sliding element and a sliding element holder which are two guide elements on which a guide device with a sliding plate assembly which has two side sliding plates and the central guide is arranged, which sliding plates are distanced from each other in the transverse direction perpendicular to the sliding direction. The central guide is arranged between the two sliding plates and is fastened to the sliding element. Each sliding plate lies against the sliding element holder by at least the following contact surfaces wherein one contact surface lies on a first plane and extends in the transverse direction and a second contact surface lies on a second plane at a distance from the first plane and also extends in the transverse direction and a third contact surface extends perpendicularly thereto.

15 Claims, 4 Drawing Sheets

(51) Int. Cl.
  *B21D 28/32*   (2006.01)
  *B23Q 3/10*    (2006.01)
  *B30B 1/40*    (2006.01)
  *F16H 25/18*   (2006.01)

(56)       References Cited

U.S. PATENT DOCUMENTS

2017/0014888 A1   1/2017  Meyer
2017/0014890 A1   1/2017  Meyer
2018/0369893 A1   12/2018 Weigelt
2019/0029230 A1   1/2019  Wolfenden et al.

FOREIGN PATENT DOCUMENTS

JP         2012-166266 A      9/2012
WO    WO 2009/039895 A1      4/2009
WO    WO 2015/132355 A1      9/2015
WO    WO 2015/132356 A1      9/2015
WO     WO-2015132357 A2 *    9/2015  ........... B21D 28/325

* cited by examiner

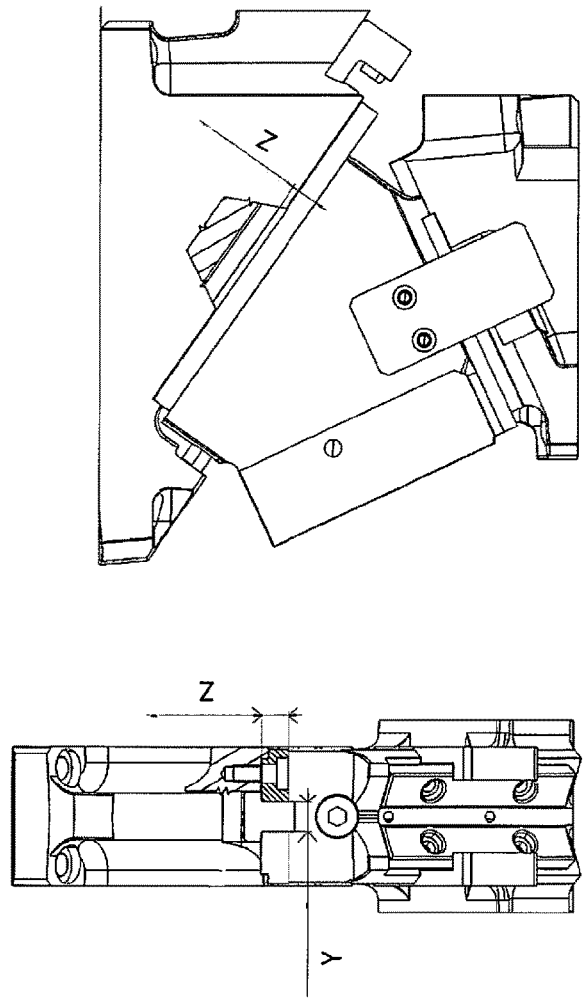

WEDGE DRIVE AND METHOD FOR PRODUCING A WEDGE DRIVE HAVING OPTIMIZED GUIDANCE

RELATED APPLICATIONS

This application claims priority to German Patent Application Nos. 20 2017 100 989.0, filed Feb. 22, 2017 and 10 2017 116 794.3, filed Jul. 25, 2017, and PCT/EP2018/051167, filed Jan. 18, 2018, the entire contents of each of which are incorporated herein by reference in their entirety.

FIELD

The present disclosure relates to a wedge drive and a method for producing a wedge drive for redirecting a perpendicular pressing force into a horizontal, preferably linear working motion.

BACKGROUND

Wedge drives are typically used in tools in reshaping processes in which structural components or materials must be reshaped under a high expenditure of force, during which a high degree of precision is required.

Wedge drives are used, e.g., in the automobile industry for manufacturing structural body parts, in particular for processing large sheet parts, for sheet metal blanks, stamping or perforating or during the deforming of such sheet parts. The forces which occur even achieve values distinctly above 1000 kN.

A basic challenge in wedge drives is that the guidings, in particular the converting into a linear motion, also actually take place according to the desired precise motion profile.

Generic wedge drives are constructed in such a manner that they comprise guide elements, sliding strips, a driver element, a sliding element and a sliding element holder which is fixed in its position, wherein the perpendicular pressing force is received by the sliding element holder.

The driver guidance serves for a linear guiding of the sliding element along the driver element. The guide device serves for the linear guiding of the sliding element along the sliding element holder in a sliding direction.

The sliding element holder, which is connected to the movable pressing element, is moved in a press in a perpendicular direction, in contrast to which the driver element is fixed in position. However, this motion should be exact as possible even under high forces, in particular when transverse forces act on the wedge drive.

It is described in DE 20 2015 106 966 U1 that such a loading regularly occurs when the wedge drive for converting structural components strikes a curved surface of the structural component during the converting process and as a consequence, forces occurring transversely to the linear working motion must be received by the wedge drive, wherein the critical factors are the sliding element holder and the sliding element.

The coordination of the guide play between the two sliding strips and the central T block is problematic in the solution shown in it. Basically, the grinding of the height of the structural components of the sliding strips for the structural height of the slides is disadvantageous since the primary surface is ground there by circumferential grinding. Refer in this regard by way of example to FIG. 4 of DE 20 2015 106 966 U1 and the description of the coordination for the exact sitting of the sliding strips in FIGS. 5a to 5d in the description of the figures. Since the system cannot be ground in an "overdetermined manner", the coordination of the height and of the width of the sliding strips are lacking in the construction shown.

A solution is suggested in the cited DE 20 2015 106 966 U1 for designing the guide device in such a manner that it ensures a sufficiently precise guidance, wherein the fastening of a side sliding plate is provided at a certain contact surface with which the latter is pressed against the guide element. The sliding strips are constructed as rectangular, parallelepipedal strips with an angular corner holder over the length of the sliding strips, wherein the adaptation of the height of the sliding strips leads to the grinding of the primary surfaces of the strips. However, we have found that this has a disadvantageous influence on the coordination of the entire structural height of the sliding.

BRIEF SUMMARY

The present disclosure therefore has the problem of suggesting an alternative solution with which the transverse forces can be caught and received in an optimal manner and in which the production and the adaptation of the sliding strips is possible in a simple and economical manner.

This problem is solved by the feature combination according to claim 1.

One aspect of the present disclosure resides in providing a specific sliding plate formation. Another aspect relates to the adjusting of the guide play between the side sliding plates and the central guidance of the suggested sliding plate formation in the production or assembly of a wedge drive.

The sliding element is arranged between the driver element and the sliding element holder. The sliding element and the sliding element holder constitute two guide elements on which a guide device is arranged with a sliding plate assembly with two side sliding plates and one central guide.

The side sliding plates are fastened on one of the two guide elements (sliding element or sliding element holder) and are at a distance from each other in a transverse direction which is perpendicular to the sliding direction. The central guide is arranged between the two side sliding plates.

According to the disclosure, a construction of the side sliding plates which has at least one shoulder is provided. A corresponding step is provided in the contact surface on the corresponding guide element so that at least two steps are provided in the guide element which are separated from one another in the transverse direction.

The two side sliding plates rest with an interlocking connection on one of the two steps with their shoulder, wherein the interlocking connection acts either in the defined transverse direction or counter to the defined transverse correction.

Therefore, according to the disclosure a web drive is provided which is constructed for redirecting a perpendicular pressing force into a horizontal, linear working motion, with a sliding element and a sliding element holder which constitute two guide elements on which a guide device with a sliding plate assembly with two side sliding plates and one central guide is arranged, wherein the side sliding plates are at a distance from one another in a transverse direction Y which is perpendicular to the sliding direction X, wherein the central guide is arranged between the two side sliding plates and is fastened on the sliding element, wherein the two side sliding plates are constructed with at least one shoulder which are formed on the corresponding step and rest on the guide element with an interlocking connection, wherein the interlocking connection acts in the defined transverse direction or against it so that transverse forces are caught and each side sliding plate rests with at least the following contact surfaces on the sliding element holder:

a. One contact surface of each lies on a first plane E1 and runs in the transverse direction Y, and b. A side surface runs perpendicularly to it and lies opposite the contact surface of the central guide, preferably forming a defined slot.

One contact surface of the side sliding plate lies on a first plane and runs in the transverse direction. A second surface lies on a plane E2, a plane at a distance from the first plane E1, and also runs in the transverse direction.

In one form the contact surface, observed in the transverse direction, is constructed to be equal to or greater compared to the higher surface of the side sliding plate.

The side sliding plate is fastened by fastening means to the first contact surface against the corresponding guiding element in an interlocking connection.

Another contact surface is constructed as a transition between the contact surface and the higher surface, namely, running perpendicularly or obliquely to them. In the case of an obliquely running contact surface, it can be attached with a positive or a negative inclination at an angle of about 70° or 110°+/−10°.

Alternatively, the transition from plane E1, i.e., the contact surface to the higher surface (plane E2) can form a right-angle shoulder or step.

The corner of the step and/or shoulder can advantageously be rounded off or provided with a radius.

An additional, second step and shoulder running in the opposite direction or in the same direction can be formed in the particular side sliding plates and the corresponding guide element. However, the interlocking connection is advantageously produced only between the side sliding plates and the contact surface running perpendicularly to the transverse direction between the particular side sliding plate and the corresponding guide element in order to avoid the attempt of a double fit.

The further alternative is the formation of a step running in the opposite direction so that two contact surfaces are located on a common plane and the contact surface is provided between them on a graduated plane so that a wraparound of the two steps of corresponding shoulders takes place. Other advantageous further developments of the disclosure are characterized in the subclaims and are presented in detail in the following together with the description of the preferred embodiment of the disclosure using the figures.

BRIEF DESCRIPTION OF THE DRAWINGS

In the figures:

FIGS. 5a, 5b, 5c and 5d show the adaptation of a sliding plate formation in a traditional solution, and;

The disclosure is explained in detail in the following with reference made to the FIGS. 1 to 6d, wherein the same reference numerals refer to the same structural and/or functional features.

FIGS. 1 to 4 show different embodiments of an exemplary wedge drive.

DETAILED DESCRIPTION

Figure 1:
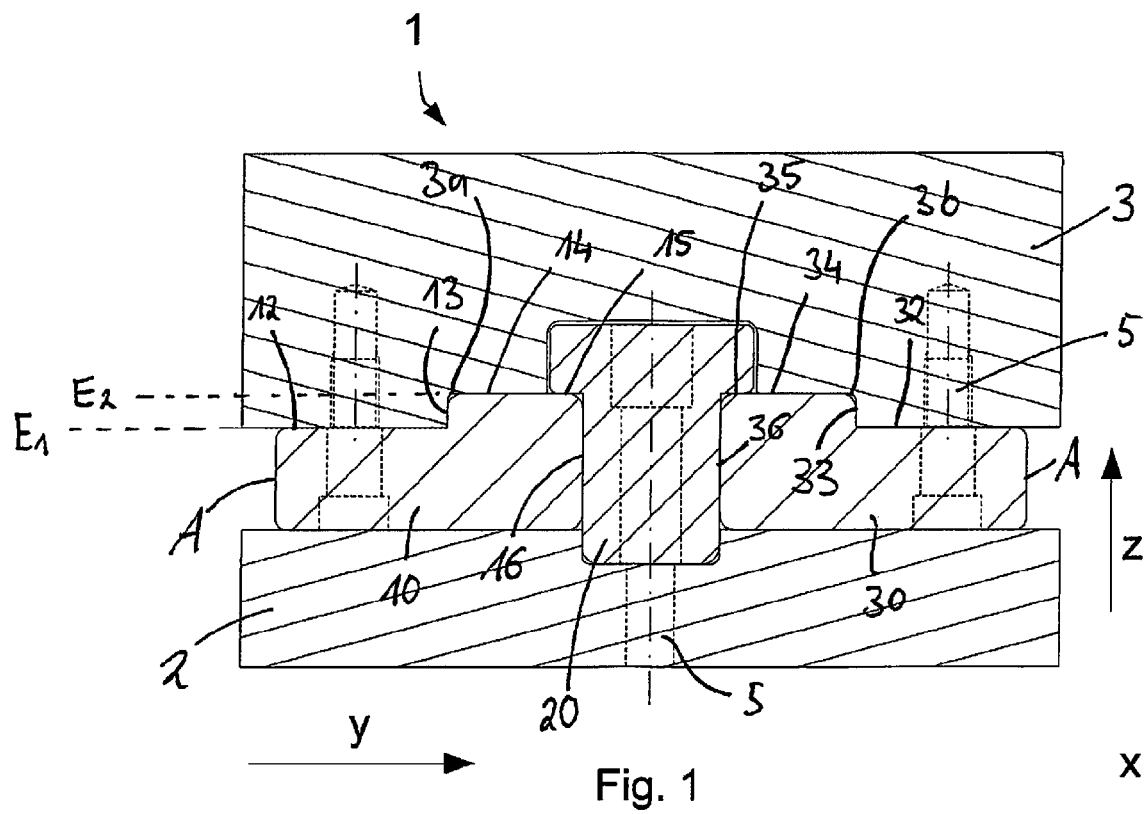
FIG. 1 shows a first exemplary embodiment of a wedge drive.
Figure 2:
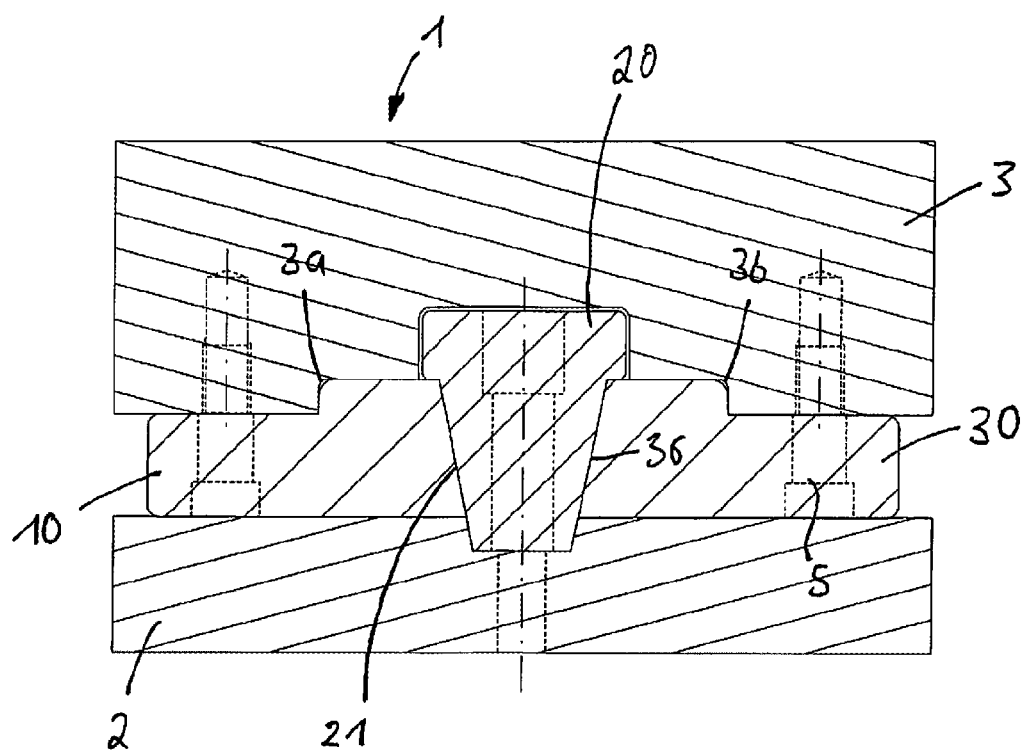
FIG. 2 shows a second exemplary embodiment of a wedge drive.

The wedge drive 1 is constructed to redirect a perpendicular pressing force into a horizontal, linear working motion and comprises a sliding element 2, a driver element (which is not shown), and a sliding element holder 3. The driver element is arranged on the sliding element 2 in a traditional manner.

Therefore, the sliding element 2 shown is arranged between the driver element and the sliding element holder 3. The sliding element 2 and the sliding element holder 3 are two guide elements 2, 3 on which a guide device is arranged with a sliding plate assembly 10, 20, 30 with two side sliding plates 10, 30 and one central guide 20.

The side sliding plates 10, 30 are fastened on the sliding element holder 3 by fastening means 5 and at a distance from one another in a transverse direction Y which is perpendicular to the sliding direction X. The central guide 20 is arranged between the two side sliding plates 10, 30 and is fastened by a fastening means 5 on the sliding element 2.

The two side sliding plates 10, 30 are formed with a shoulder 11, 31. A corresponding step 3a, 3b is provided in the contact surface on the corresponding guide element 3 so that two steps at a distance from one another in the transverse direction Y are provided in the guide element.

Each of the two side sliding plates 10, 30 is present in an interlocking connection on one of the two steps 3a, 3b with their shoulder 11, 31, wherein the interlocking connection acts in or counter to the defined transverse direction Y so that transverse forces are caught.

Each side sliding plate 10, 30 comprises the surfaces 12, 13, 14 or 32, 33, 34.

The first (outer) surface 12 is a contact surface 12, 32 of the side sliding plate 10 or 30 and it rests on a first plane E1 and runs in the transverse direction Y. The surface 14 lies on a second plane E2 at a distance from the first plane and also runs in the transverse direction Y. The third surface 13 or 33 runs perpendicular to them.

The surface of the side sliding plates 10, 30, which forms the side surface 14, 34 facing the central guide 20, also forms a surface 15, 35 in order to optionally rest against a corresponding contact surface of the central guide 20, which also runs in or near the plane E2.

The contact surface 12, 32 in the plane E1 is constructed to be somewhat larger, i.e., wider, viewed in the transverse direction Y, compared to the surface 14, 34 in the plane E2 of the side sliding plate. The contact surface 12, 32 extends from the outer edge 80 of the side sliding plate 10, 30 to the perpendicular side surface 13 and 33. The surface 14, 34 extends from the side surface 13 or 33 in the direction of the central guide 20 to the side surface 15 or 35.

The other surface 13, 33 is constructed as a transition between the first and the second surface 12, 14 and 32, 34 and runs perpendicularly to the latter. Therefore, the transition from the first via the second to the third contact surface forms a shoulder or step.

Figure 3:
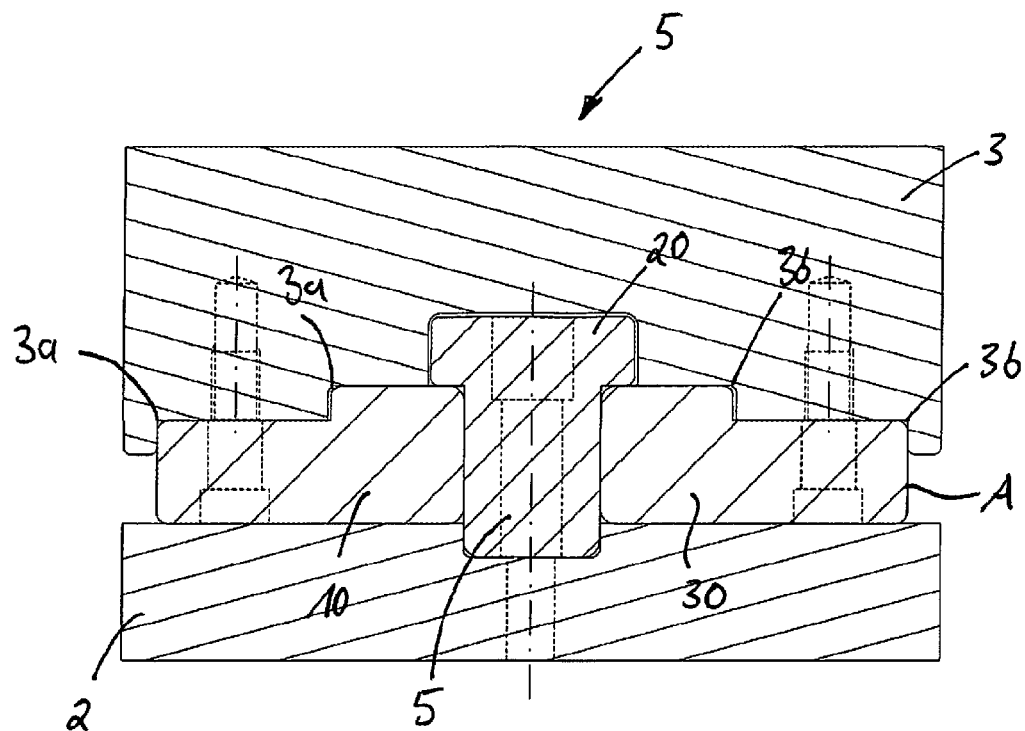
FIG. 3 shows a third exemplary embodiment of a wedge drive.
Figure 4:
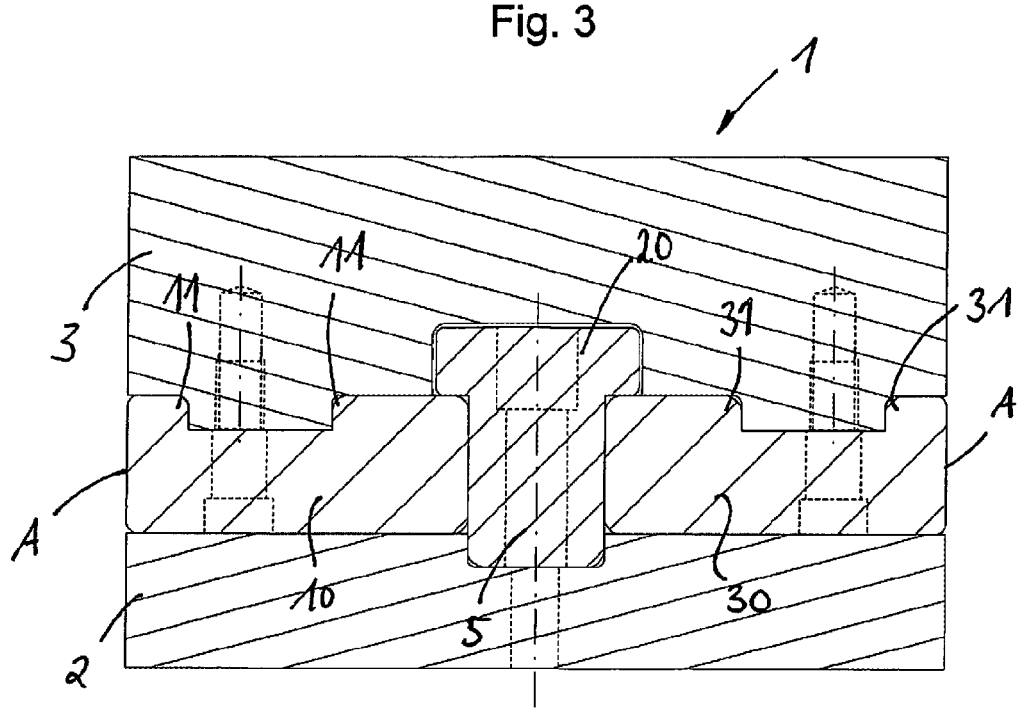
FIG. 4 shows a fourth exemplary embodiment of a wedge drive.

In FIG. 3 another step 3a, 3b is provided on sliding element holder 3 for each side sliding plate 10, 30. In FIG. 4 each side sliding plate 10, 30 comprises another shoulder 11, 31 which rests in an interlocking connection against the step of the sliding element holder 3 which step is formed in the opposite direction opposite the other shoulder. The contact surface 12, 32 located like a saddle between the two shoulders is fastened by a fastening means 5, namely, a screw 5, to the sliding element holder 3.

FIGS. 5a, 5b, 5c and 5d show a view of the adaptation of a sliding plate formation in a traditional solution.

FIG. 5a shows a view in partial section in which the coordination is shown in direction Z and in direction Y, which is necessary for adjusting the guide play between the side sliding plates and the central guide.

The coordination takes place here, as in the FIGS. 5c and 5d, wherein a grinding takes place with the aid of grinding bodies S by a favorable circumferential grinding, which has manufacturing advantages. This grinding acts on the whole directly at the height of the side sliding plates 10, 30, wherein this adaptation takes place in the area of the fastening sections, therefore the primary surface of the side sliding plates 10, 30. However, this effects the structural height of the wedge drive since the extent of the distance is changed on the whole via the side sliding plates as a consequence.

Figure 6B:
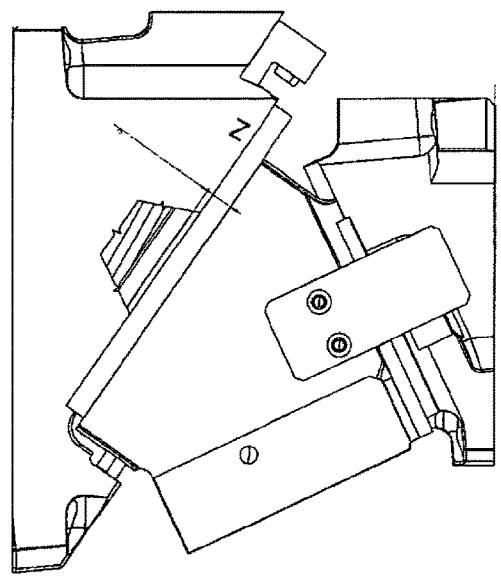
FIGS. 6a, 6b, 6c and 6d show the adaptation of a sliding plate formation in the solution according to the disclosure.
Figure 6A:
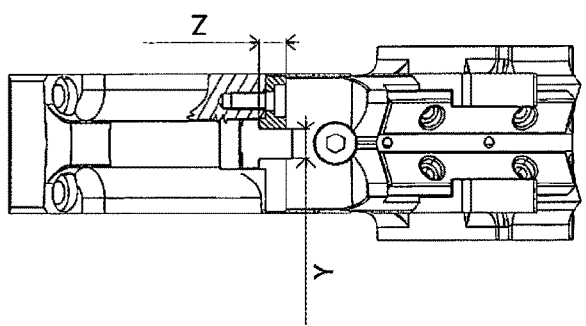
Figure 6D:
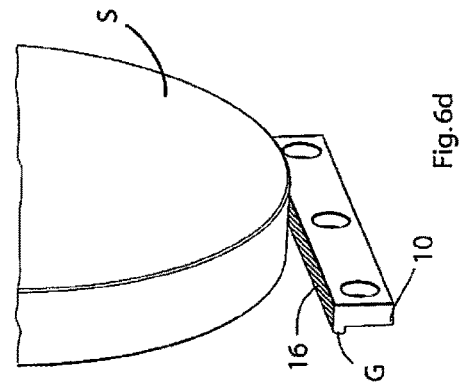
Figure 6C:
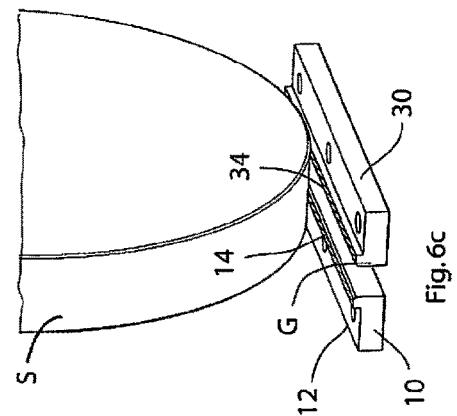

According to the concept of the present disclosure, the adaptation of the sliding plate formation takes place as is shown in the FIGS. 6a. 6b, 6c and 6d. A play between 0.01 and 0.03 can be adjusted with the suggested method.

The adjusting of the guidance play between the side sliding plates 10, 30 and the central guide 20 takes place with the following steps:
a. Production of the center guide 20 after a tolerance on fit;
b. Determining the required sliding strip height of the sliding strips in the area of the sections G;
c. Determining the required slot measure between the sliding strips 10, 30 to the central guide 20;
d. Grinding the sliding strips 10, 30 (namely, in the area G, i.e., the surfaces 14, 34) preferably by circumferential grinding in order to produce the required sliding strip height, and
e. Grinding at least one of the side surfaces 16, 36 facing the central guide, preferably by circumferential grinding at one of the two sliding strips 10, 30.

The disclosure is not limited in its execution to the previously indicated, preferred exemplary embodiments but rather a number of variants are conceivable which make use of the presented solution even in the case of basically differently designed embodiments. Therefore, the side sliding plates 10, 30 can be designed on at least three side surfaces with a coating against wear, preferably as fixed lubricant surfaces or as a sintered layer.

The invention claimed is:

1. A wedge drive designed to redirect a vertical pressing force into a horizontal, linear working motion, comprising a sliding element and a sliding element holder which are two guide elements on which a guide device with a sliding plate assembly with two side sliding plates and a central guide is arranged, wherein the side sliding plates are at a distance from one another in a transverse direction (Y) which is perpendicular to a sliding direction (X) of the side sliding plates, wherein the central guide is arranged between the two side sliding plates and is fastened on the sliding element, wherein the two side sliding plates are constructed with at least one shoulder which rests with an interlocking connection on a corresponding step formed on the guide element, wherein a sliding plate section (G) with a surface follows each of the shoulders, wherein the contact surfaces, viewed in the plane (E1) in the transverse direction (Y), are constructed to be larger in comparison to the surfaces in the area (G), wherein the interlocking connection acts in or against the defined transverse direction so that transverse forces are caught and each side sliding plate rests with at least the following contact surfaces on the sliding element holder:
   a. a first contact surface of each side sliding plate that lies on a first plane (E1) and runs in the transverse direction (Y),
   b. a second contact surface that lies on a second plane (E2) at a distance from the first plane and also runs in the transverse direction (Y), and
   c. a third contact surface that runs perpendicularly to the latter, wherein
   the particular side sliding plates are fastened by fastening means to the sliding element holder and the fastening means are arranged in an area inside the particular first contact surface.

2. The wedge drive according to claim 1, wherein a side surface of each side sliding plate runs perpendicularly or obliquely to the first plane (E1) and is opposite a contact surface of the central guide.

3. The wedge drive according to claim 1, wherein no fastening means for fastening the side sliding plates to the sliding element holder are arranged or provided in an area of the particular second contact surfaces of the particular side sliding plates.

4. The wedge drive according to claim 1, wherein the contact surfaces each extend from the outer edge of the side sliding plates to the perpendicularly running contact surfaces.

5. The wedge drive according to claim 1, wherein the contact surfaces each extend from an outer edge (A) of the side sliding plates to the contact surfaces running obliquely or transversely to them.

6. The wedge drive according to claim 1, wherein, for the lateral support of each side sliding plate, either another step is provided on the sliding element holder or another shoulder is provided on the side sliding plate with which an interlocking connection to the sliding element holder takes place.

7. The wedge drive according to claim 1, wherein the side sliding plates are constructed at least three side surfaces with an anti-wear layer.

8. The wedge drive according to claim 7, wherein the anti-wear layer is formed as fixed lubricant surfaces or as a sintered coating.

9. A method for adjusting the guide play between the side sliding plates and the central guide in the production or assembly of a wedge drive according to claim 1, comprising the following steps:
   a. production of the central guide after a tolerance on fit;
   b. determining a required sliding plate height of the side sliding plates in the area of the sections (G);
   c. determining a required slot measure between the side sliding plates to the central guide;
   d. grinding the side sliding plates for producing the required sliding plate height in the area of the sections (G); and
   e. grinding at least one side surface of the side sliding plates facing the central guide.

10. The method according to claim 9, wherein the step of grinding the side sliding plates includes grinding the second contact surfaces.

11. The method according to claim 9, wherein the step of grinding the side sliding plates-includes circumferential grinding.

12. The method according to claim 9, wherein the step of grinding at least one side surface facing the central guide includes circumferential grinding at one of the two side sliding plates.

13. The wedge drive according to claim 6, wherein the contact surfaces, viewed in the plane (E1) in the transverse direction (Y), are constructed to be 1.3 to 1.8 times larger in comparison to the surfaces in the area (G).

14. A wedge drive designed to redirect a vertical pressing force into a horizontal, linear working motion, comprising a sliding element and a sliding element holder which are two guide elements on which a guide device with a sliding plate assembly with two side sliding plates and a central guide is arranged, wherein the side sliding plates are at a distance from one another in a transverse direction (Y) which is perpendicular to a sliding direction (X) of the side sliding plates, wherein the central guide is arranged between the two side sliding plates and is fastened on the sliding element, wherein the two side sliding plates are constructed with at least one shoulder which rests with an interlocking connection on a corresponding step formed on the guide element, wherein, for the lateral support of each side sliding plate, either another step is provided on the sliding element holder or another shoulder is provided on the side sliding plate with which an interlocking connection to the sliding element holder takes place, wherein the interlocking connection acts in or against the defined transverse direction so that transverse forces are caught and each side sliding plate rests with at least the following contact surfaces on the sliding element holder:

a. a first contact surface of each side sliding plate that lies on a first plane (E1) and runs in the transverse direction (Y), b. a second contact surface that lies on a second plane (E2) at a distance from the first plane and also runs in the transverse direction (Y), and c. a third contact surface that runs perpendicularly to the latter, wherein the particular side sliding plates are fastened by fastening means to the sliding element holder and the fastening means are arranged in an area inside the particular first contact surface.

15. The wedge drive according to claim 14, wherein a sliding plate section (G) with a surface follows each of the shoulders, and wherein the contact surfaces, viewed in the plane (E1) in the transverse direction (Y), are constructed to be larger in comparison to the surfaces in the area (G).

* * * * *